United States Patent
Park et al.

(10) Patent No.: US 11,841,038 B2
(45) Date of Patent: *Dec. 12, 2023

(54) PANEL CLAMPING AND MOUNTING MECHANISM

(71) Applicant: Solar Clam-P, LLC, Philadelphia, PA (US)

(72) Inventors: Samuel Park, Philadelphia, PA (US); Mahnyong Park, Philadelphia, PA (US)

(73) Assignee: Solar Clam-P, LLC, Philadelphia, PA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/303,204

(22) Filed: May 24, 2021

(65) Prior Publication Data

US 2021/0270301 A1    Sep. 2, 2021

Related U.S. Application Data

(63) Continuation of application No. 15/985,424, filed on May 21, 2018, now Pat. No. 11,015,627, which is a
(Continued)

(51) Int. Cl.
*F16B 5/06*        (2006.01)
*F24S 25/636*      (2018.01)
(Continued)

(52) U.S. Cl.
CPC ........... *F16B 5/0685* (2013.01); *F16M 13/02* (2013.01); *F24S 25/61* (2018.05); *F24S 25/636* (2018.05);
(Continued)

(58) Field of Classification Search
CPC ...... F16B 1/00; F16B 5/00; F16B 5/06; F16B 5/0607; F16B 5/0635; F16B 5/0685;
(Continued)

(56) References Cited

U.S. PATENT DOCUMENTS 1,411,882 A    4/1922    Eberl
1,506,011 A    8/1924    Lawson
(Continued)

FOREIGN PATENT DOCUMENTS

EP        2149648 A1    2/2010
FR        2935410 A1    3/2010
WO    WO/2012/083786 A1    6/2012

OTHER PUBLICATIONS

Innovative Medical Products, Inc, Surgical Table Clamps, Threaded Clamp, 2015, https://web.archive.org/web/20150506222159/http://www.innovativemedical.com/products/302clamp.html.

*Primary Examiner* — Michael Safavi
(74) *Attorney, Agent, or Firm* — Vos-IP, LLC

(57) ABSTRACT

The present invention relates to a panel clamp securable to a variety of mounting mechanisms. The clamp includes first and second members, each having an edge extending beyond at least a portion of its side surface to form an overhang, and each includes a plurality of holes passing therethrough. When the overhang of the first member is fitted over a top surface of a panel and the overhang of the second member is fitted over a bottom surface of the panel, such that the plurality of holes in the first member is substantially aligned with the plurality of holes in the second member, mechanical fasteners can be inserted through the plurality of holes to secure the first and second members to the panel. An additional mechanical fastener is inserted through the clamp to secure the clamp to a mounting mechanism.

11 Claims, 19 Drawing Sheets

Related U.S. Application Data continuation-in-part of application No. 14/928,412, filed on Oct. 30, 2015, now abandoned, which is a continuation-in-part of application No. 13/792,434, filed on Mar. 11, 2013, now Pat. No. 9,175,704, which is a continuation-in-part of application No. 13/316,007, filed on Dec. 9, 2011, now Pat. No. 9,175,880.

(60) Provisional application No. 61/571,210, filed on Jun. 23, 2011, provisional application No. 61/464,911, filed on Mar. 11, 2011, provisional application No. 61/459,267, filed on Dec. 10, 2010.

(51) Int. Cl.
| | | |
|---|---|---|
| *H02S 20/30* | (2014.01) | |
| *F16M 13/02* | (2006.01) | |
| *G02F 1/1333* | (2006.01) | |
| *H02S 20/26* | (2014.01) | |
| *F24S 25/61* | (2018.01) | |
| *F16B 2/12* | (2006.01) | |
| *F24S 25/35* | (2018.01) | |
| *F24S 25/12* | (2018.01) | |
| *F24S 30/425* | (2018.01) | |
| *F24S 25/70* | (2018.01) | |

(52) U.S. Cl.
CPC ........ *G02F 1/133308* (2013.01); *H02S 20/26* (2014.12); *H02S 20/30* (2014.12); *F16B 2/12* (2013.01); *F16B 5/0635* (2013.01); *F24S 25/12* (2018.05); *F24S 25/35* (2018.05); *F24S 25/70* (2018.05); *F24S 30/425* (2018.05); *G02F 1/133322* (2021.01); *G02F 2201/46* (2013.01); *Y02B 10/10* (2013.01); *Y02E 10/47* (2013.01)

(58) Field of Classification Search
CPC ..... F16B 2/12; B25B 1/00; B25B 1/06; B25B 1/103; B25B 1/2405; B25B 5/00; B25B 5/16; F24J 2/5258; F24S 25/12; F24S 25/61; F24S 25/636; H02S 20/30; Y02E 10/47; F16M 13/02
USPC ................. 52/461, 463, 467, 780, 509, 512; 248/231.61, 316.1, 316.2, 316.6, 125.8
See application file for complete search history.

(56) References Cited

U.S. PATENT DOCUMENTS

| | | | |
|---|---|---|---|
| 1,772,068 A | 8/1930 | Cibulas | |
| 1,910,934 A | 5/1933 | Segal | |
| 1,911,384 A | 5/1933 | Olson | |
| 2,080,190 A | 5/1937 | Sinner | |
| 2,131,530 A * | 9/1938 | Weed | B24B 41/066 451/226 |
| 2,348,314 A | 5/1944 | Spalding | |
| 2,537,216 A | 1/1951 | Frederick | |
| 2,559,833 A | 7/1951 | Stellin | |
| 3,213,576 A | 10/1965 | Davies | |
| 3,263,385 A | 8/1966 | Pauls | |
| 3,264,020 A | 8/1966 | De Ridder | |
| 3,367,077 A | 2/1968 | Johnston | |
| 3,486,158 A | 12/1969 | Soltysik et al. | |
| 3,553,918 A | 1/1971 | Dauson | |
| 3,579,912 A | 5/1971 | Panko et al. | |
| 3,844,086 A | 10/1974 | Radtke | |
| 3,844,087 A | 10/1974 | Schultz et al. | |
| 3,899,164 A * | 8/1975 | Newman | A47B 29/00 248/448 |
| 3,990,199 A | 11/1976 | Gallo | |
| 4,125,251 A | 11/1978 | Jamieson, Jr. | |
| 4,150,660 A | 4/1979 | Peters et al. | |
| 4,243,020 A | 1/1981 | Mier | |
| 4,406,505 A | 9/1983 | Avramovich | |
| 4,519,173 A | 5/1985 | Roberts | |
| 4,523,413 A | 6/1985 | Koppenberg | |
| 4,578,910 A | 4/1986 | Germeroth et al. | |
| 4,597,235 A | 7/1986 | Olsen | |
| 4,660,814 A | 4/1987 | Shader et al. | |
| 4,699,346 A | 10/1987 | Bahm | |
| 4,783,941 A | 11/1988 | Loper et al. | |
| 5,121,583 A | 6/1992 | Hirai et al. | |
| 5,165,317 A | 11/1992 | Findlay | |
| 5,226,274 A | 7/1993 | Sommerstein | |
| 5,265,585 A | 11/1993 | Stinson | |
| 5,274,978 A | 1/1994 | Perkonigg et al. | |
| 5,283,992 A | 2/1994 | Morassutti | |
| 5,307,602 A | 5/1994 | Lebraut | |
| 5,357,699 A | 10/1994 | Padawer | |
| 5,571,338 A | 11/1996 | Kadonome et al. | |
| 5,909,920 A | 6/1999 | Dalinkiewicz | |
| 5,953,865 A | 9/1999 | Rickards | |
| 6,196,536 B1 | 3/2001 | Hintze | |
| 6,405,437 B1 | 6/2002 | Sussmilch et al. | |
| 6,406,229 B1 | 6/2002 | Derrick et al. | |
| 6,564,514 B1 | 5/2003 | Rickards | |
| 6,672,018 B2 | 1/2004 | Shingleton | |
| 7,003,827 B2 | 2/2006 | Demayo | |
| 7,435,134 B2 | 10/2008 | Lenox | |
| 7,435,897 B2 | 10/2008 | Russell | |
| 7,574,842 B2 | 8/2009 | Russell | |
| 7,592,537 B1 | 9/2009 | West | |
| 7,600,349 B2 | 10/2009 | Liebendorfer | |
| 7,748,175 B2 | 7/2010 | Liebendorfer | |
| 7,758,011 B2 | 7/2010 | Haddock | |
| 7,780,472 B2 | 8/2010 | Lenox | |
| 7,814,899 B1 | 10/2010 | Port | |
| 7,956,280 B2 | 6/2011 | Kobayashi | |
| 7,987,641 B2 | 8/2011 | Cinnamon | |
| 8,181,402 B2 | 5/2012 | Tsuzuki et al. | |
| 8,256,697 B2 | 9/2012 | Amburgey | |
| 8,266,848 B2 | 9/2012 | Miros et al. | |
| 8,475,185 B2 | 7/2013 | Rivera et al. | |
| 8,495,839 B2 | 7/2013 | Tsuzuki et al. | |
| 8,505,864 B2 | 8/2013 | Taylor et al. | |
| 8,572,909 B2 | 11/2013 | Rivera et al. | |
| 8,678,332 B2 | 3/2014 | Benthien et al. | |
| 8,733,027 B1 | 5/2014 | Marston et al. | |
| 8,740,163 B1 | 6/2014 | Taylor et al. | |
| 8,813,441 B2 | 8/2014 | Rizzo | |
| 9,022,334 B1 | 5/2015 | Demayo | |
| 2001/0035041 A1 | 11/2001 | Dobbins et al. | |
| 2003/0101662 A1 | 6/2003 | Ullman | |
| 2008/0000173 A1 | 1/2008 | Lenox et al. | |
| 2008/0010915 A1 | 1/2008 | Liebendorfer | |
| 2008/0078124 A1 | 4/2008 | Shimura et al. | |
| 2008/0087275 A1 | 4/2008 | Sade et al. | |
| 2008/0244881 A1 | 10/2008 | Zante | |
| 2008/0245007 A1 | 10/2008 | Mcdonald | |
| 2008/0250614 A1 | 10/2008 | Zante | |
| 2008/0282755 A1 | 11/2008 | Grimmer et al. | |
| 2008/0289622 A1 | 11/2008 | Liu et al. | |
| 2008/0302928 A1 | 12/2008 | Haddock | |
| 2009/0114269 A1 | 5/2009 | Fletcher et al. | |
| 2009/0250580 A1 | 10/2009 | Strizki | |
| 2009/0282755 A1 | 11/2009 | Abbott et al. | |
| 2009/0322007 A1 | 12/2009 | Chang | |
| 2010/0065108 A1 | 3/2010 | West et al. | |
| 2010/0089390 A1 | 4/2010 | Miros et al. | |
| 2010/0146899 A1 | 6/2010 | Zante | |
| 2010/0206301 A1 | 8/2010 | Aftanas | |
| 2010/0229367 A1 | 9/2010 | Franklin | |
| 2010/0269430 A1 | 10/2010 | Haddock | |
| 2010/0271611 A1 | 10/2010 | Van Der Pasch et al. | |
| 2010/0275975 A1 | 11/2010 | Monschke et al. | |
| 2010/0276558 A1 | 11/2010 | Faust et al. | |
| 2010/0284737 A1 | 11/2010 | Mcpheeters | |
| 2011/0005512 A1 | 1/2011 | Ruesswick | |
| 2011/0088740 A1 | 4/2011 | Mittan et al. | |
| 2011/0138585 A1 | 6/2011 | Kmita et al. | |
| 2011/0192098 A1 | 8/2011 | Chung | |

(56) References Cited

U.S. PATENT DOCUMENTS

| | | |
|---|---|---|
| 2011/0214365 A1 | 9/2011 | Aftanas |
| 2011/0214366 A1 | 9/2011 | Haddock et al. |
| 2011/0214367 A1 | 9/2011 | Haddock et al. |
| 2011/0214368 A1 | 9/2011 | Haddock et al. |
| 2011/0239546 A1 | 10/2011 | Tsuzuki et al. |
| 2011/0271611 A1 | 11/2011 | Maracci et al. |
| 2011/0302857 A1 | 12/2011 | Mcclellan et al. |
| 2012/0032045 A1 | 2/2012 | Lallier et al. |
| 2012/0102853 A1 | 5/2012 | Rizzo |
| 2012/0244729 A1 | 9/2012 | Rivera et al. |
| 2012/0248271 A1 | 10/2012 | Zeilenga |
| 2012/0267490 A1 | 10/2012 | Haddock et al. |
| 2012/0299233 A1 | 11/2012 | Header |
| 2013/0091786 A1 | 4/2013 | Dupont et al. |
| 2013/0192150 A1 | 8/2013 | Dupont et al. |
| 2013/0240466 A1 | 9/2013 | Sponseller |
| 2016/0111996 A1 | 4/2016 | Stephan et al. |
| 2016/0333585 A1 | 11/2016 | Miller et al. |
| 2018/0342974 A1 | 11/2018 | Jasmin et al. |
| 2019/0372507 A1 | 12/2019 | Kobayashi |

\* cited by examiner

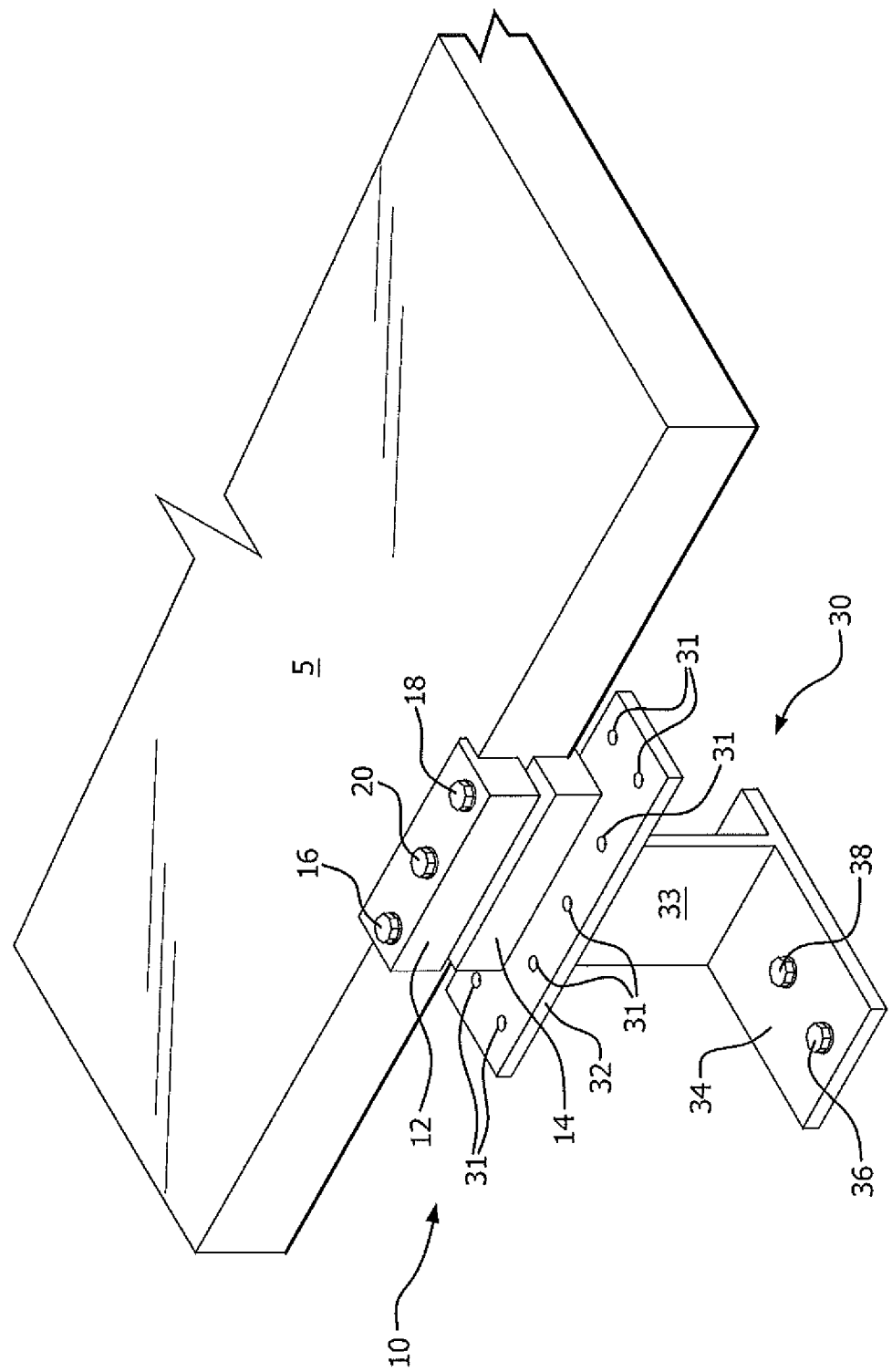

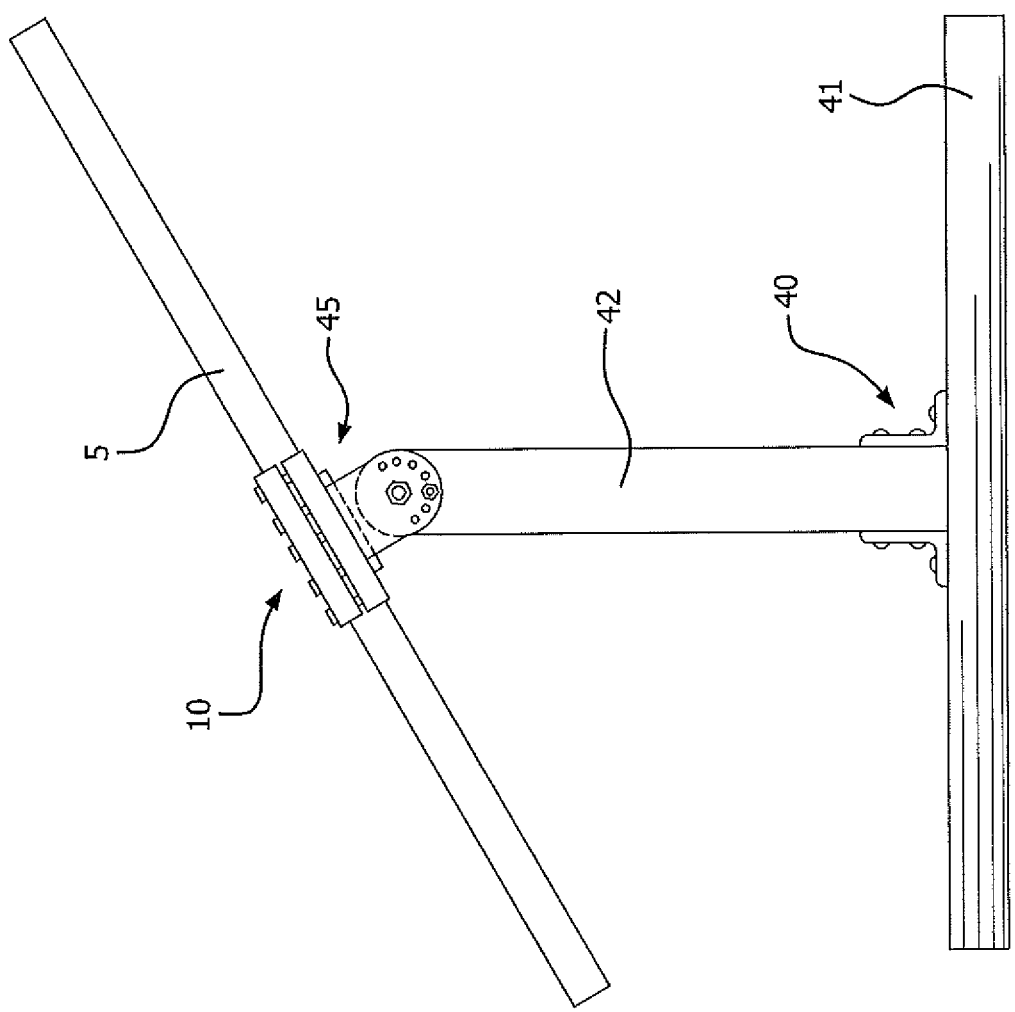

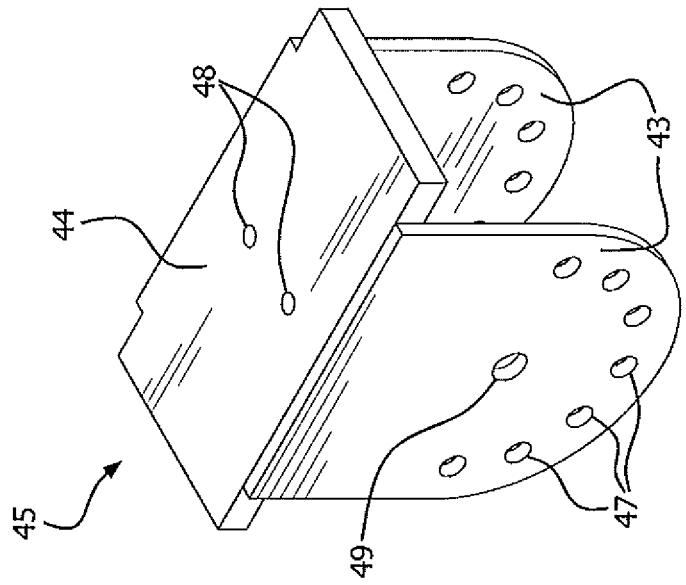
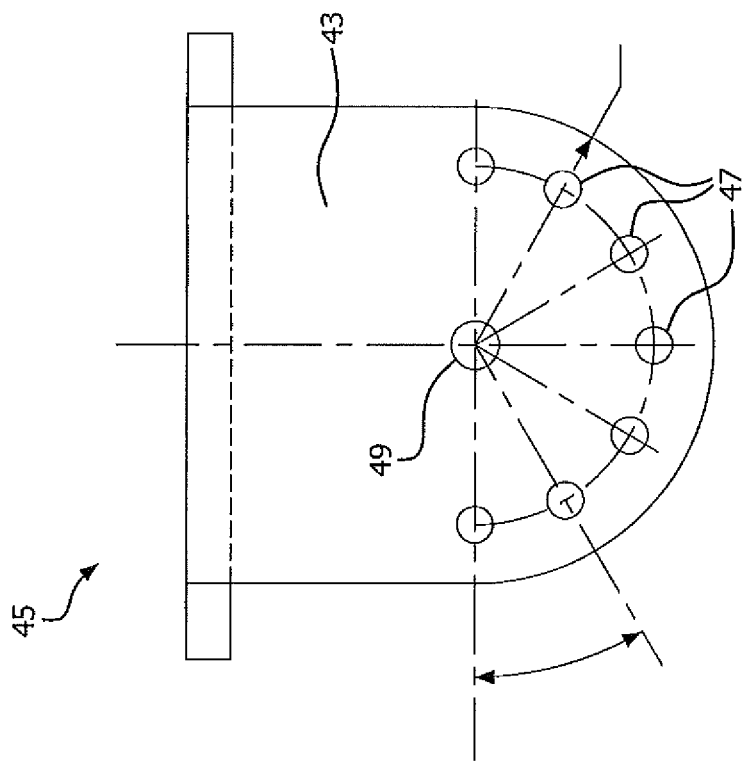
FIG. 5B
FIG. 5A

PANEL CLAMPING AND MOUNTING MECHANISM

CROSS-REFERENCE TO RELATED APPLICATIONS

The present application is a continuation of U.S. patent application Ser. No. 15/985,424 filed on May 21, 2018, which is continuation-in-part of U.S. patent application Ser. No. 14/928,412, filed Oct. 30, 2015, which is a continuation-in-part of U.S. patent application Ser. No. 13/792,434, filed Mar. 11, 2013, which is a continuation-in-part of U.S. patent application Ser. No. 13/316,007, filed Dec. 9, 2011, which claims the benefit of U.S. Provisional Patent Application No. 61/459,267, filed Dec. 10, 2010, U.S. Provisional Patent Application No. 61/464,911, filed Mar. 11, 2011, and U.S. Provisional Patent Application No. 61/571,210, filed Jun. 23, 2011, the entire disclosures of which are incorporated by reference herein as if each being set forth herein in its entirety.

BACKGROUND OF THE INVENTION

Due to the continued increase in cost and environmental impact of fossil fuels, solar panels have always been recognized in the alternative energy market as a commercially viable mechanism for capturing renewable energy. However, one drawback to the use of solar panels is that solar panels generally occupy a significant amount of space. So as not to use up desirable space, solar panels are often mounted on rooftops or exterior walls of existing buildings. In areas where ground space is plentiful, ground-mounted solar panel systems or arrays also have been constructed by mounting solar panels on supports.

Unfortunately, existing mounting systems are generally difficult to assemble and disassemble. In many cases, whole rows of solar panels must be removed simply to access the one panel in need of repair. Therefore, there is a need in the art for a system and method for mounting panels that allows for a cost-effective and improved speed of assembly and disassembly, as well as for improved accessibility of individual panels within a solar panel array. The present invention satisfies this need.

SUMMARY OF THE INVENTION

The present invention relates to a panel clamp. The panel clamp includes first and second members, each having a top surface, a bottom surface and a side surface, wherein the top surface of each member includes an edge extending beyond at least a portion of its side surface to form an overhang, and wherein a plurality of holes pass through the top and bottom surfaces of each member, and a plurality of mechanical fasteners, wherein, when the overhang of the first member is fitted over a top surface of a panel and the overhang of the second member is fitted over a bottom surface of the panel, such that the plurality of holes in the first member is substantially aligned with the plurality of holes in the second member, the plurality of mechanical fasteners can be inserted through the plurality of holes to secure the first and second members to the panel, in one embodiment, at least two of the aligned holes receive a mechanical fastener to secure the first and second members to the panel. In another embodiment, at least one of the aligned holes receives a mechanical fastener to secure the panel clamp to a surface mount. In another embodiment, the surface mount comprises a bracket. In another embodiment, the surface mount comprises a rail. In another embodiment, the panel is a photovoltaic (PV) module. In another embodiment, the panel is a liquid crystal display (LCD).

The present invention also relates to a system for securing a panel to a surface. The system includes a panel clamp comprising first and second members, each having a top surface, a bottom surface and a side surface, wherein the top surface of each member includes an edge extending beyond at least a portion of its side surface to form an overhang, and wherein a plurality of holes pass through the top and bottom surfaces of each member, a plurality of mechanical fasteners, and a mount comprising a surface anchoring plate, a panel clamp anchoring plate and a support element connecting the surface anchoring plate to the clamp anchoring plate, wherein the surface anchoring plate and the clamp anchoring plate each have a plurality of holes therethrough, wherein, when the overhang of the first member is fitted over a top surface of a panel and the overhang of the second member is fitted over a bottom surface of the panel, such that the plurality of holes in the first member is substantially aligned with the plurality of holes in the second member, at least one of the mechanical fasteners can be inserted through the plurality of holes to secure the first and second members to the panel to form a panel clamp, and wherein the mount is secured to a surface by inserting at least one of the mechanical fasteners through the holes of the surface anchoring plate and into the surface, and the panel clamp is secured to the mount by inserting at least one of the mechanical fasteners through at least one of the aligned holes of the panel clamp into at least one of the holes in the clamp anchoring plate. In one embodiment, at least two of the mechanical fasteners are inserted to secure the first and second members to the panel. In another embodiment, the panel is a photovoltaic (PV) module. In another embodiment, the panel is a liquid crystal display (LCD). In another embodiment, the distance between the surface anchoring plate and the clamp anchoring plate is adjustable. In another embodiment, the support element is a bolt that engages a threaded hole in either or both of the surface anchoring plate and the clamp anchoring plate, and adjustment is made by either rotation of the bolt in one or both of the holes in the surface anchoring plate and the clamp anchoring plate, or by rotation of either the surface anchoring plate or the clamp anchoring plate about the bolt.

The present invention also relates to an adjustable panel mount. The mount includes a mounting arm having a front surface and a back surface, and a distal end that includes first and second holes passing through the front and back surfaces thereof, a mounting head having a front plate, a back plate and a top plate connecting the front and back plates, such that a space between the front and back plates is formed underneath the top plate, wherein the top plate has a plurality of holes passing therethrough, and the front and back plates have a plurality of aligned holes passing therethrough, and a plurality of mechanical fasteners, wherein, when the front and back plates of the mounting head are fitted overtop or within the distal end of the mounting arm and at least two of the aligned holes of the front and back plates of the mounting head are also aligned with the first and second holes of the mounting arm, a first mechanical fastener can be inserted through the aligned holes incorporating the first hole of the mounting arm to secure the mounting head to the mounting arm, and a second mechanical fastener can be inserted through the aligned holes incorporating the second hole of the mounting arm to position the top plate of the mounting head at a desired angle. In one embodiment, at least one of the aligned holes in the front and back plates of the mounting head provide different angles of the top plate of the mounting head. In another embodiment, the mount includes a panel clamp, the panel clamp comprising first and second members, each having a top surface, a bottom surface and a side surface, wherein the top surface of each member includes an edge extending beyond at least a portion of its side surface to form an overhang, and wherein a plurality of holes pass through the top and bottom surfaces of each member, a plurality of mechanical fasteners, wherein, when the overhang of the first member is fitted over a top surface of a panel and the overhang of the second member is fitted over a bottom surface of the panel, such that the plurality of holes in the first member is substantially aligned with the plurality of holes in the second member, at least one of the mechanical fasteners can be inserted through the plurality of holes of the first and second members to secure the first and second members to the panel to form a panel clamp, and wherein the panel clamp is secured to the top plate of the mounting head by inserting at least one of the mechanical fasteners through at least one of the aligned holes of the panel clamp into at least one of the holes in the top plate of the mounting head.

The present invention also relates to a system for securing a panel to a mount. The system includes a panel clamp comprising first and second members, each having a top surface, a bottom surface and a side surface, wherein the top surface of each member includes an edge extending beyond at least a portion of its side surface to form an overhang, and wherein a plurality of holes pass through the top and bottom surfaces of each member, a plurality of mechanical fasteners, and a mount that includes a frame having a base, side walls and opposing grooves extending inwardly toward each other, and a rail plate having flange portions on opposing sides of the rail plate, such that the flange portion on each side of the rail plate fits slidably within the opposing grooves of the frame, and wherein the rail plate includes a plurality of holes passing therethrough, wherein, when the overhang of the first member is fitted over a top surface of a panel and the overhang of the second member is fitted over a bottom surface of the panel, such that the plurality of holes in the first member is substantially aligned with the plurality of holes in the second member, at least one of the mechanical fasteners can be inserted through the plurality of holes to secure the first and second members to the panel to form a panel clamp, and wherein the panel clamp is secured to the mount by inserting at least one of the mechanical fasteners through at least one of the aligned holes of the panel clamp into at least one of the holes in the rail plate. In another embodiment, the base of the frame further includes at least one hole passing therethrough, such that a mechanical fastener may be inserted through the at least one hole of the frame base to secure the mount to a rail of a second mount.

BRIEF DESCRIPTION OF THE FIGURES

For the purpose of illustrating the invention, there are depicted in the drawings certain embodiments of the invention. However, the invention is not limited to the precise arrangements and instrumentalities of the embodiments depicted in the drawings.

FIG. 1, comprising FIGS. 1A and 1B, is a schematic perspective view of an exemplary panel clamping and mounting mechanism, according to an aspect of the present invention. FIG. 1A includes a two piece clamp and mount, while FIG. 1B includes an integrated bottom clamp and mount, such that the top clamp can be fastened directly into the mount to secure a panel.

FIG. 2, comprising FIG. 2A is a perspective view of the top and bottom plates of the clamping mechanism. FIG. 2B is a side view of a clamp plate, and FIG. 2C is a front view of a clamp plate. FIG. 2D is a perspective view of an alternative top plate, while FIGS. 2E and 2F are a side view and front view of the top plate of FIG. 2D, respectively.

FIG. 3, comprising FIG. 3A is a perspective view of an adjustable mount. FIG. 3B is a side view of the adjustable mount of FIG. 3A. FIG. 3C is a perspective view of an adjustable mount have the components of a bottom clamp plate integrated therewith, and FIG. 3D is a perspective view of the adjustable mount of FIG. 3C with the top clamping plates positioned above it.

FIG. 4, comprising FIGS. 4A and 4B, is an exemplary embodiment of a tilting clamping mechanism. FIG. 4A is a side view of an exemplary panel clamping and mounting mechanism, where the mounting head is adjustable. FIG. 4B is a side view of a similar mechanism as FIG. 4A, but having an integrated bottom clamp and mount, such that the top clamp can be fastened directly into the mount to secure a panel.

FIG. 5, comprising FIGS. 5A-5D, is an exemplary adjustable mounting head, according to an aspect of the present invention. FIG. 5A is a front view of the adjustable mounting head, and FIG. 5B is a perspective view of the adjustable mounting head. FIG. 5C is a perspective view of an adjustable mounting head having the components of a bottom clamp plate integrated therewith, and FIG. 5D is a perspective view of the adjustable mount of FIG. 5C with the top clamping plates positioned above it.

FIG. 6, comprising FIG. 6A is a front view of the mounting arm, and FIG. 6B is a side view of the mounting arm.

DETAILED DESCRIPTION OF THE INVENTION

Figure 1B:
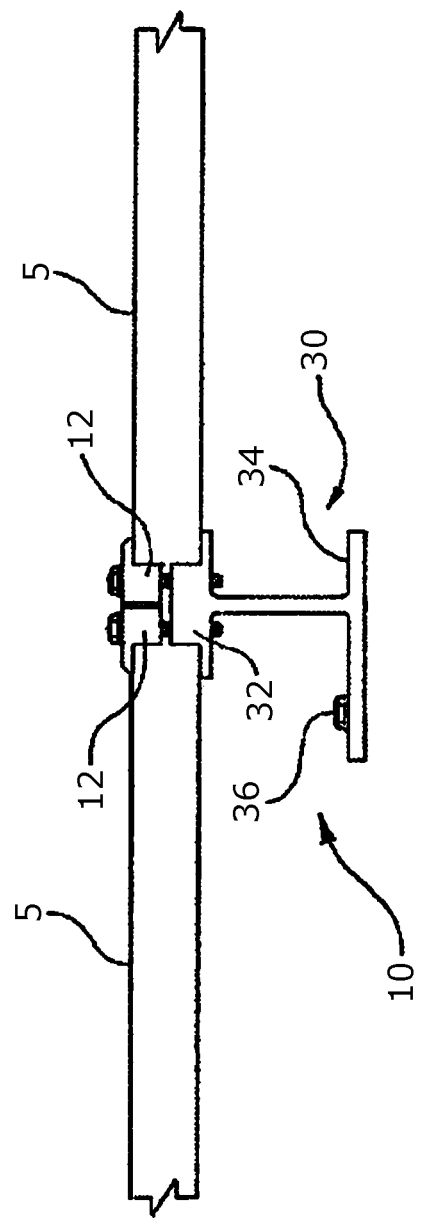

It is to be understood that the figures and descriptions of the present invention have been simplified to illustrate elements that are relevant for a clear understanding of the present invention, while eliminating, for the purpose of clarity, many other elements found in panel mounting systems and methods. Those of ordinary skill in the art may recognize that other elements and/or steps are desirable and/or required in implementing the present invention.

However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

"Holes" as used herein may include any opening suitable for receiving a bolt, pin or other mechanical fastener for securing two components together. Such holes may be smooth, so as to receive a pin, or they may be threaded, so as to receive a screw or bolt. Holes should not be construed as being limited to any particular type of hole designed for receiving a particular mechanical component.

"Mechanical fastener" as used herein may include any device that holds two or more objects together. Exemplary mechanical fasteners are, without limitation, a bolt, screw, rivet or pin.

"Panel" as used herein may include any structure having a perimeter with at least one edge having a portion that is substantially linear. Generally, a panel is rectangular in shape. Exemplary panels are photovoltaic (PV) modules, liquid-crystal displays (LCDs), and other generally rectangular objects.

"Surface" as used herein refers to the outermost or topmost boundary of an object. A surface may be a final surface to which a panel or panels is to be mounted to, such as a roof, wall or the ground, or it may be a portion of a component of the present invention, such as a top or bottom surface of a clamp plate or member.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6 and any whole and partial increments therebetween. This applies regardless of the breadth of the range.

The present invention includes a system that is designed for mounting virtually any size panel, such as a PV module or LCD, onto a surface, such as on the ground, on the roof or on an interior or exterior wall of a commercial or residential building. The surface may be flat, graded or multi-tiered, and may be horizontal, vertical, or at any angle therebetween. Further, the surface may form part of a mobile object, such as a truck, recreational vehicle (RV), buss, car, boat, train, plane, or any object attached thereto. As contemplated herein, the present invention is not limited to the mounting of PV modules, but rather is suitable for mounting any sort of panel or structure having at least one substantially linear edge. Thus, while the exemplary embodiments relate particularly to the mounting of PV modules, it should be appreciated that any sort of panel may be mounted as described and illustrated herein.

Generally, the system of the present invention includes two primary components. The first component includes a clamping mechanism that fastens onto the PV module, while the second component includes a mounting mechanism that fastens both to the clamping mechanism and to the desired roof or wall surface.

In an exemplary embodiment, the clamping mechanism may include two plates and two bolts. In this example, one plate rests on top and along an edge of the outer frame of the PV module, while the second plate rests on the corresponding bottom portion of the outer frame of the PV module, such that, when fastened together by the two screws, the two plates form a clamp onto the outer frame of the PV module. Further, the clamp can be adjusted according to both the thickness of the panel frame, as well as its position anywhere along the perimeter of the frame of the PV module. The clamping mechanism generally includes three holes for tightening the clamp as well as for attaching the clamp to the mounting mechanism as described herein. In other embodiments, the clamping mechanism may include additional holes in the plates, such as 4, 5, 6, 7, 8, 9, 10 or any desired number. In an embodiment including three holes, two of the holes are used for the screws to fasten the two plates together on the PV module frame, while the third hole is used for a third bolt to go through and fasten the clamping mechanism to the mounting mechanism, which may be, for example, a mounting bracket or mounting rail, as described in further detail herein. There is no limitation to the positioning of the holes, either for tightening of the clamping mechanism or for attaching the clamping mechanism to the desired mounting mechanism.

As illustrated in FIGS. 1 and 2, the present invention includes a clamping mechanism 10 suitable for attachment to a panel 5, such as a solar panel, and is separately attachable to a mount 30, for mounting panel 5 to a surface, such as the roof or wall of a building. As contemplated herein, the present invention is suitable for mounting on a surface having any angle, such as a substantially horizontal or 0° surface, a substantially vertical or 90° surface, or any angle or pitch between 0-90°.

Figure 2A:
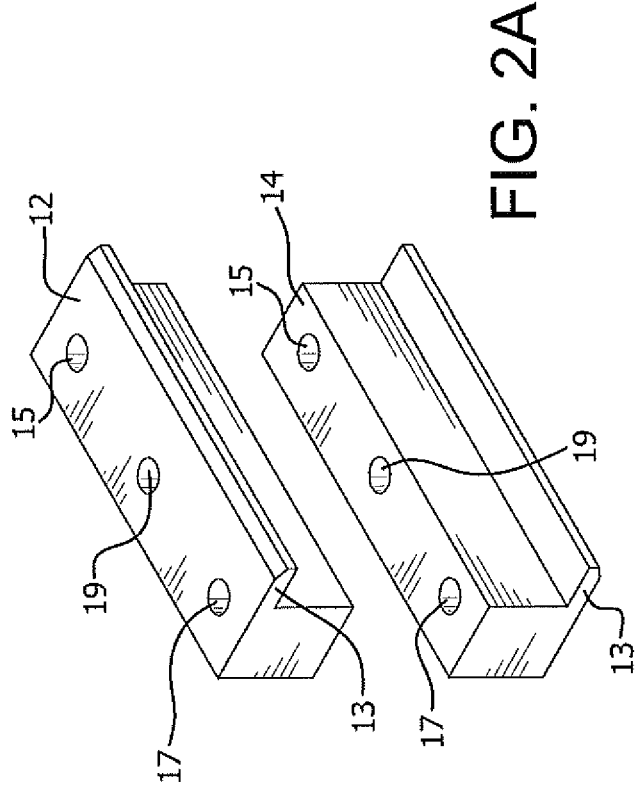
FIGS. 2A-2F, is an exemplary clamping mechanism, according to an aspect of the present invention.
Figure 2C:
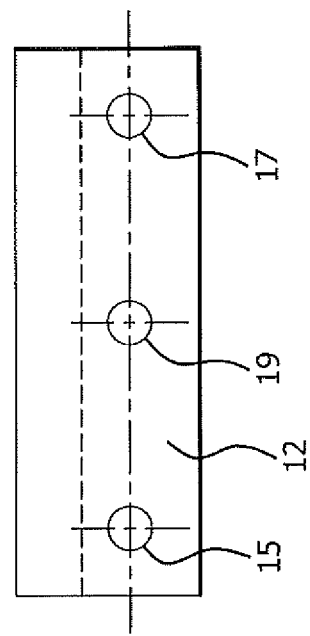
Figure 2B:
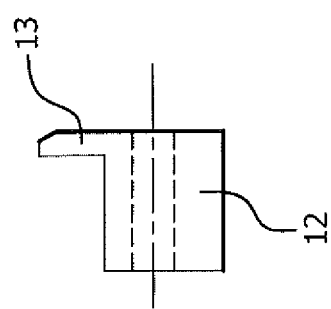
Figure 2D:
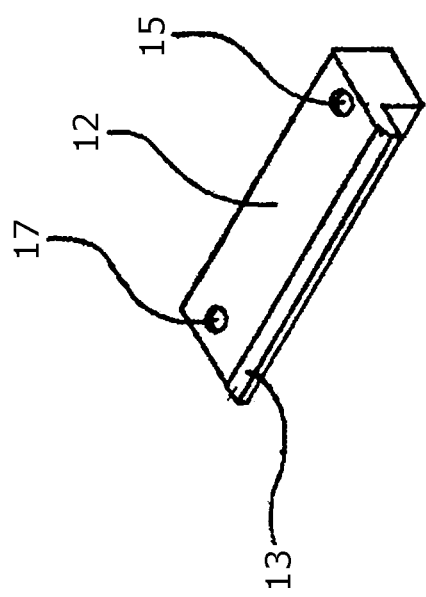
Figure 2F:
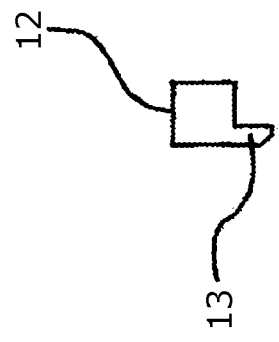
Figure 2E:
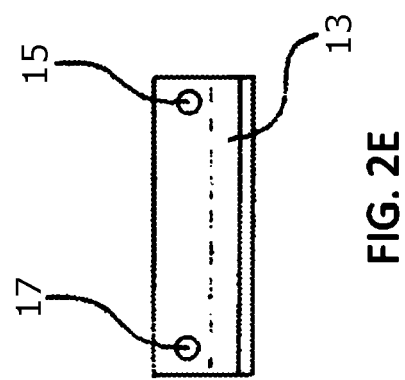

As shown in FIGS. 1 and 2A, clamping mechanism 10 includes a first or top plate or member 12 and a second or bottom plate or member 14. Both top and bottom plates 12 and 14 have matching holes 15, 17 and 19 passing through plates 12 and 14, such that holes 15, 17 and 19 of each plate are aligned when clamping panel 5. In the embodiment of FIGS. 1 and 2, holes 15 and 17 are suitable for securing top and bottom clamping plates 12 and 14 together with bolts, while hole 19 is suitable for securing the assembled clamp to a mounting mechanism that is securable to the desired surface. Plates 12 and 14 also include an extended lip or edge 13, which serves to extend slightly over the top and bottom surfaces of panel 5 to create an enhanced grasping area for engaging or fitting onto panel 5.

Clamping mechanism 10 engages and clamps panel 5 as follows. Top plate 12 is positioned such that its extended edge 13 rests on the front face of panel 5, with the remainder of top plate 12 aligned along the side of panel 5, with holes 15, 17 and 19 running substantially vertical or otherwise substantially perpendicular to the plane of the front face of panel 5. Bottom plate 14 is then positioned such that its extended edge 13 rests on the bottom face of panel 5 and the remainder of bottom plate 14 is substantially underneath top plate 12, such that corresponding holes 15, 17 and 19 are aligned. Bolts are inserted through holes 15 and 17 of both top and bottom plates 12 and 14 to securely attach the clamp to panel 5. Alternatively, plates 12 and 14 may be positioned such that they bridge a gap between two adjacent panels, to secure the two panels together directly at their adjacent edges when positioned in a panel array. Depending on the type of panel and use of clamping mechanism 10, the clamp can be secured tightly to panel 5, such that the clamp cannot move along the side of panel 5, or it can be secured in such a way that it can slide along the length of panel 5 without falling off. It should be appreciated that clamping mechanism 10 may further include any sort of textured surface on the portions of top and bottom plates 12 and 14 that contact panel 5, such as extended edges 13 forming an overhang, to improve any of a friction grip, or the ability to slide along the side of panel 5, as would be understood by those skilled in the art. For example, such textured surface may include small ridges, "teeth" or other contoured surface to improve grasping of the panel. Such regions may further include secondary materials to provide enhanced grasping, such as an adhesive or other chemical coating, or a rubber layer.

As contemplated herein, clamping mechanism 10 may come in virtually any length, such as any length from 1 in. to 10 ft., more preferably any length from 4 in. to 12 in., for example, where the desired length will depend on the size and/or type of panel being mounted. Top and bottom plates 12 and 14 may be constructed from any suitable building material that provides sufficient strength, rigidity and durability, such as aluminum and other metals and metal alloys, galvanized metals/alloys, moldable polymers and polymer blends, rubber and the like. All bolts, pins or other mechanical fasteners may be of a standard size and commercially available, such as bolts ranging from ¼ to ½ in. Consequently, the diameter of any particular hole will be based on the desired mechanical fastener to be received therein.

Clamping mechanism 10 is designed to engage and/or be secured to a variety of mounting mechanisms. By having clamping mechanism 10 separate from the mounting mechanism, an installer has the ability to remove a particular clamped panel at any time by removing a single bolt, without other panels being affected and without disrupting the mount as secured to the desired surface.

For example, referring again to FIG. 1A, mount 30 may generally include a surface anchoring plate 34 for anchoring the mount to a roof, wall or other surface, a clamp anchoring plate 32 for securing clamping mechanism 10, and a support element 33 (also referred to herein as a web, crossbeam, beam, etc.), transversing plates 32 and 34 for providing separation and supportive strength between surface anchoring plate 34 and clamp anchoring plate 32. While plates 32 and 34 are illustrated as being substantially parallel with support element 33 running substantially perpendicular thereto, it should be appreciated that clamp anchoring plate 32 may be positioned at any desired angle compared to surface anchoring plate 34 or to support element 33. For example, clamp anchoring plate 32 may be approximately 15°, 30°, 45°, 60°, 75°, 90°, 105°, 120°, 135°, 150° or 165° with respect to surface anchoring plate 34. The length of the surface anchoring plate may be of any desirable size, such as ranging from 2 ft to 4 ft, depending on the size of the PV module and the number of such modules to be mounted. Surface anchoring plate 34 may be wide enough for a standard or custom ballast pan to sit on top of and to hold additional weight, as would be understood by those skilled in the art.

As illustrated in FIG. 1A, surface anchoring plate 34 includes two holes (not shown) through which lag bolts 36 and 38 may be inserted to securely anchor or otherwise fasten mount 30 to the roof or wall surface. The number and/or size of the holes in surface anchoring plate 34 is not limited to any particular number or size, and thus may alternatively include 1, 3, 4, 5, 6, 8, 10 or any number of holes through which one or more bolts may be inserted to anchor mount 30 to the desired surface. The size of the holes should be commensurate with the type of bolt being inserted therethrough. Furthermore, the holes may be positioned anywhere in surface anchoring plate 34.

Clamp anchoring plate 32 also includes a series of holes 31 for receiving clamping bolt(s) 20 for securing clamping mechanism 10 to mount 30. In one example, clamp anchoring plate 32 includes two rows of 5 holes running along the length of clamp anchoring plate 32 in parallel. In this example, each row of 5 holes may is suitable for securing a clamping mechanism 10, such that two clamping mechanisms 10 may be secured, back-to-back, to clamp anchoring plate 32 at the same time. By having a series of holes in a row, a panel installer can elect which hole in the row is most suitable for attaching clamping mechanism 10 to mount 30, thereby providing the installer the ability to adjust the positioning of clamping mechanism 10 not only on the panel itself, but also with respect to where it is fastened to mount 30.

Figure 3B:
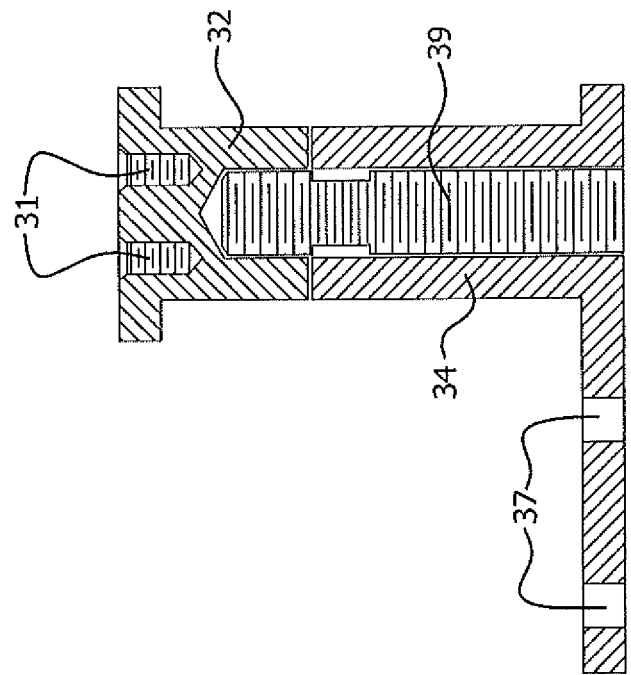
FIGS. 3A-3D, is an exemplary adjustable mounting mechanism, according to an aspect of the present invention.
Figure 3A:
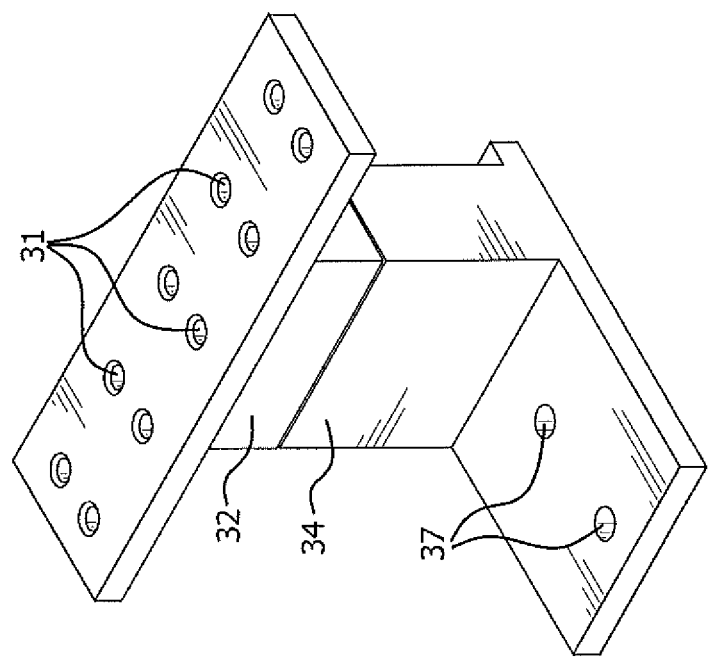

In another embodiment, mount 30 may be adjustable, such that an installer has the option to adjust the height of the panel from the surface, for example, to compensate for the warping of wood roofs, or to allow more heat to pass through the solar panels for more efficiency. For example, as shown in FIGS. 3A and 3B, clamp anchoring plate 32 and surface anchoring plate 34 are separate components held together by one or more bolts 39, which may be a ½ inch thread bolt, for example. The distance between plates 32 and 34 can be adjusted via advancing or retracting bolt 39 through the threaded holes of either or both plates 32 and 34, as would be understood by those skilled in the art. In other embodiments, such adjustment can be accomplished by other mechanical means as would be understood by those skilled in the art. For example, the support element between plates 32 and 34 may alternatively be a telescoping arm or beam, such that the distance between plates 32 and 34 may likewise be adjustable.

Figure 3C:
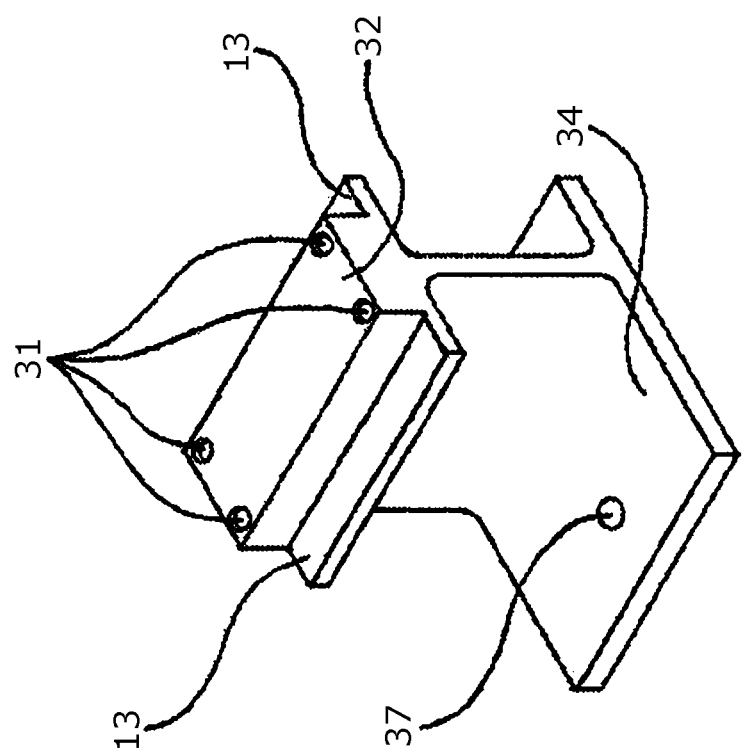
Figure 3D:
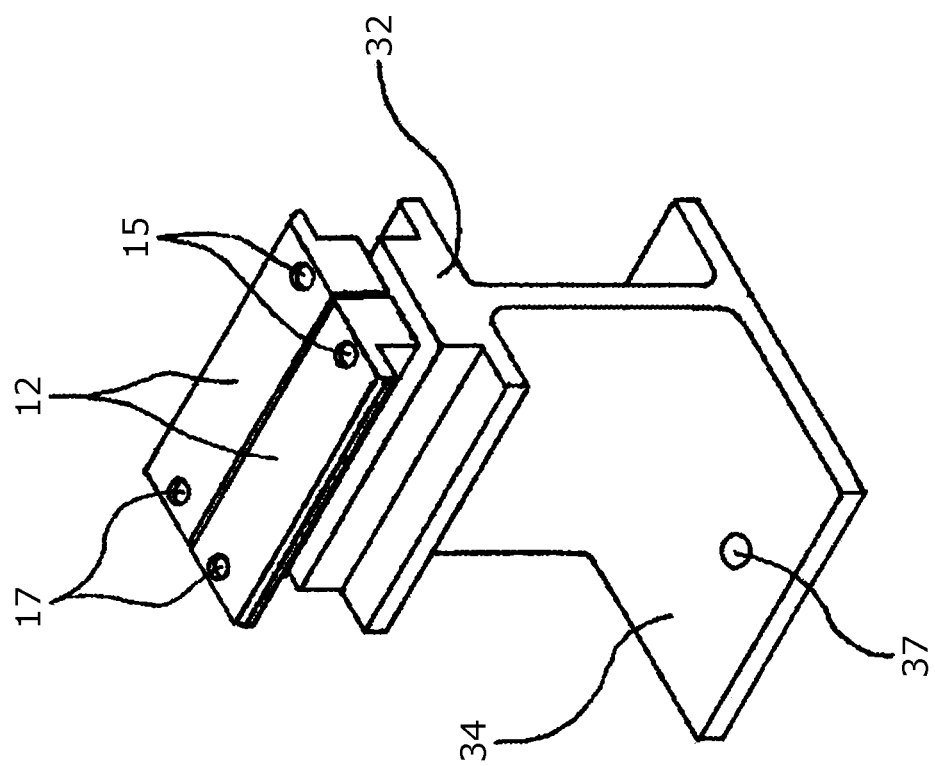

In another exemplary embodiment, the bottom plate 14 of clamp 10 may be integrated into anchoring plate 32 of mount 30. For example, as shown in FIGS. 1B, 2D-2F and 3C-3D, anchoring plate 32 incorporates the features of previously described bottom plate 14, such that top plate 12 can be directly fastened to anchoring plate 32 to secure panel 5 as illustrated, without the need for bottom plate 14. It should be appreciated that mount 30 as illustrated in the embodiments of FIGS. 3C and 3D may include any of the additional features as described for the embodiments of FIGS. 3A and 3B, without limitation.

In another exemplary embodiment, the mounting mechanism can include means for "tilting" the attached panel, or otherwise adjusting the angle at which the panel is positioned relative to the surface mounted thereto. For example, as seen in FIG. 4A, clamping mechanism 10, being secured to panel 5, is fastened to adjustable mounting head 45, which is also attached to mounting arm 42. Mounting arm 42 is likewise secured to the desired surface 41 via any standard means as would be understood by those skilled in the art, including a standard bracket 40 bolted to surface 41, by welding or any other attachment mechanism. In still other embodiments, mounting arm 42 and surface 41 may be integrated into a single "T" bar construct, which is itself secured to a desired surface. By adjusting the position of mounting head 45, the angle of panel 5 can be altered relative to the desired surface.

Figure 5C:
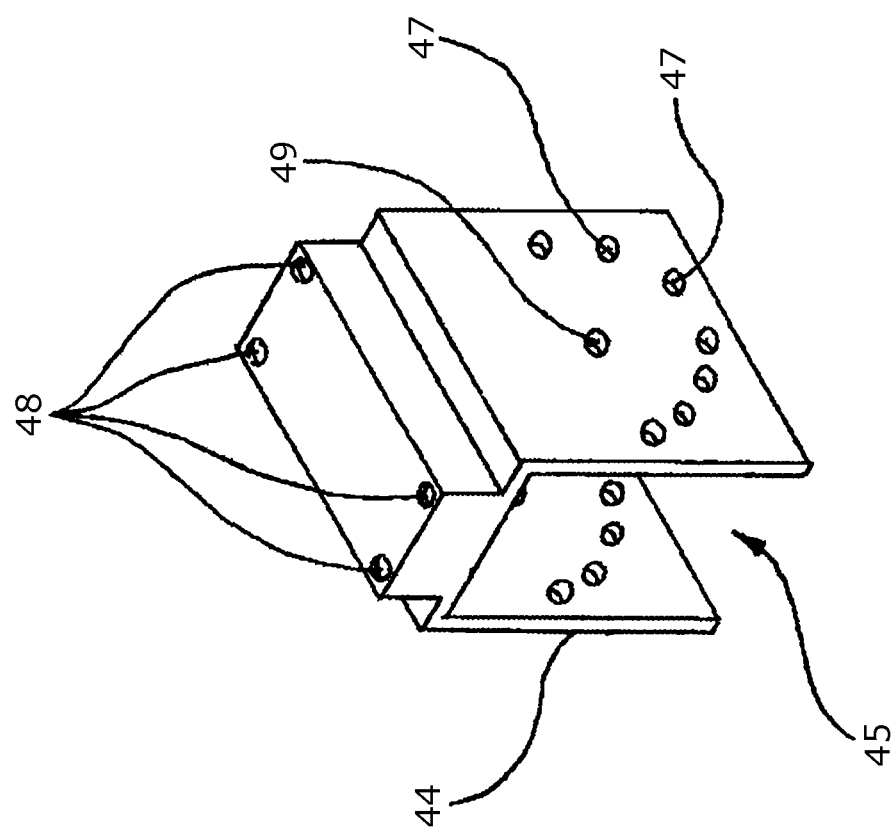
Figure 6B:
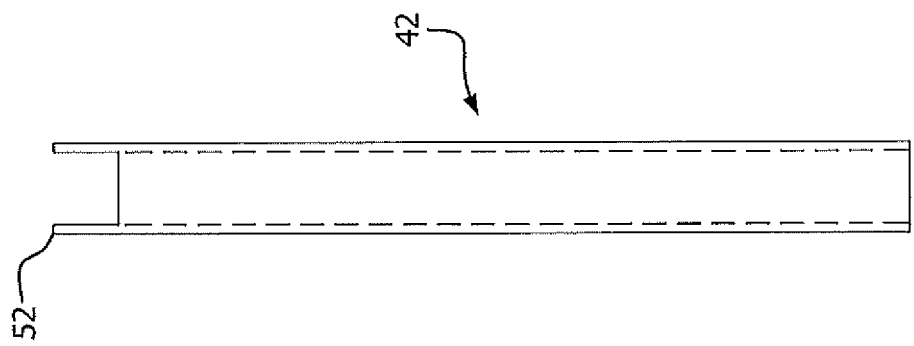
FIGS. 6A-6B, is an exemplary mounting arm for the adjustable mounting head of FIG. 5.
Figure 6A:
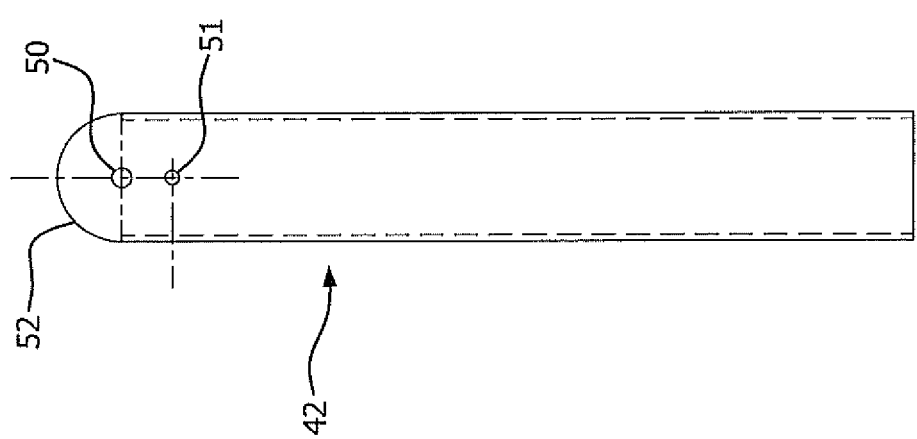

As shown in FIGS. 5A and 5B, adjustable mounting head 45 may include front and back plates 43 attached together via top plate 44 to which clamping mechanism 10 is attached via holes 48. While plates 43 are illustrated as being rounded, plates 43 may be any shape, including oval, square, rectangular, triangular or any other shape desired. Front and back plates 43 have corresponding or matching holes 47 and 49 for engaging and attaching to mounting arm 42. Similarly, mounting arm 42 has corresponding holes 50 and 51 for attachment to adjustable mounting head 45, has shown in FIGS. 6A and 6B. To attach mounting head 45 to mounting arm 42, the attachment end 52 of mounting arm 42 containing holes 50 and 51 is fitted within (or outside of) front and back plates 43 of mounting head 45, such that hole 49 of mounting head 45 is aligned with hole 50 of mounting arm 42, and at least one of holes 47 of mounting head 45 is aligned with hole 51 of mounting arm 42. Mounting arm 42 may include extended edges or plates, as illustrated in FIG. 6B, which may or may not include holes 50 or 51, or mounting arm 42 may not include any extended edges or plates. A bolt or pin may be inserted through holes 49 and 50 to secure mounting head 45 to mounting arm 42, such that mounting head 42 can rotate or pivot freely around the bolt or pin. A second bolt or pin may be inserted through one of holes 47 and through hole 51 to lock the mounting head into place. By selecting a particular hole 47 to insert the bolt or pin through, the installer can thereby select the angle at which the panel is positioned relative to the surface. Mounting head 45 can include markings identifying what angles are achieved by selecting any particular hole 47. For example, each hole 47 can represent a particular preset angle between and including 0° and 180°, such as 0°, 15°, 30°, 45°, 60°, 75°, 90°, 105°, 120°, 135°, 150°, 165° and 180°, by non-limiting example. It should be appreciated that any number of holes 47 may be used, each representing any panel angle desired. In an alternative embodiment, the adjusting means may include or be replaced by other mechanical features for accomplishing the same goal, such mechanisms including spring loaded pins or spring actuated levers, detents and the like to divide the rotation of mounting head 45 into discrete increments, or otherwise resist or arrest such rotation at desired angles.

Figure 4B:
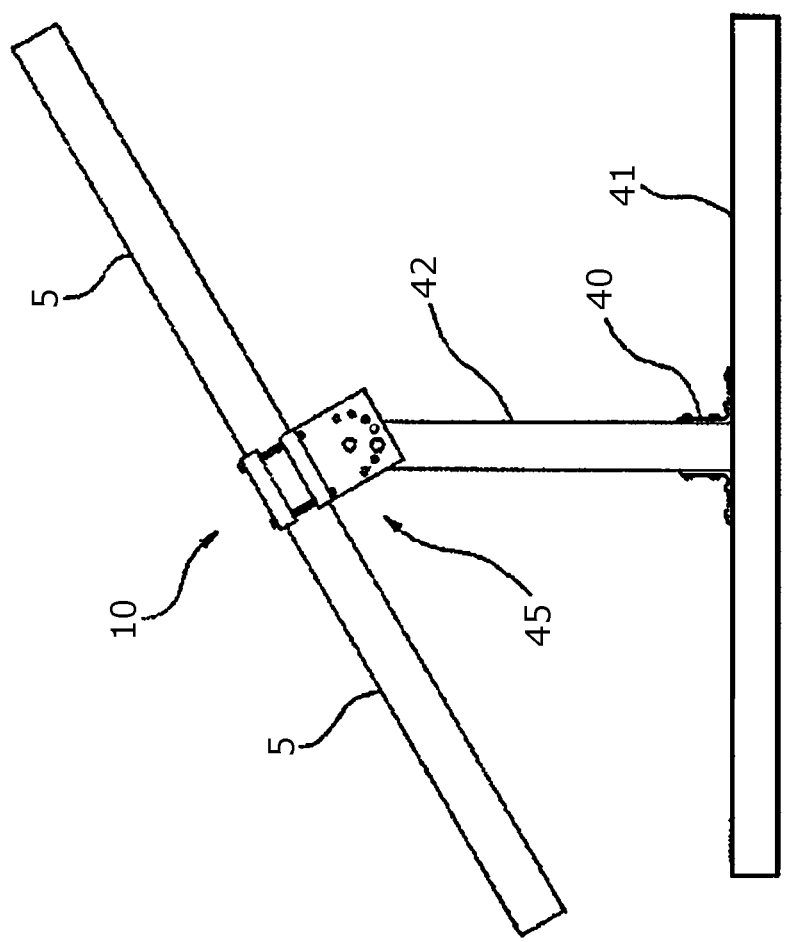
Figure 5D:
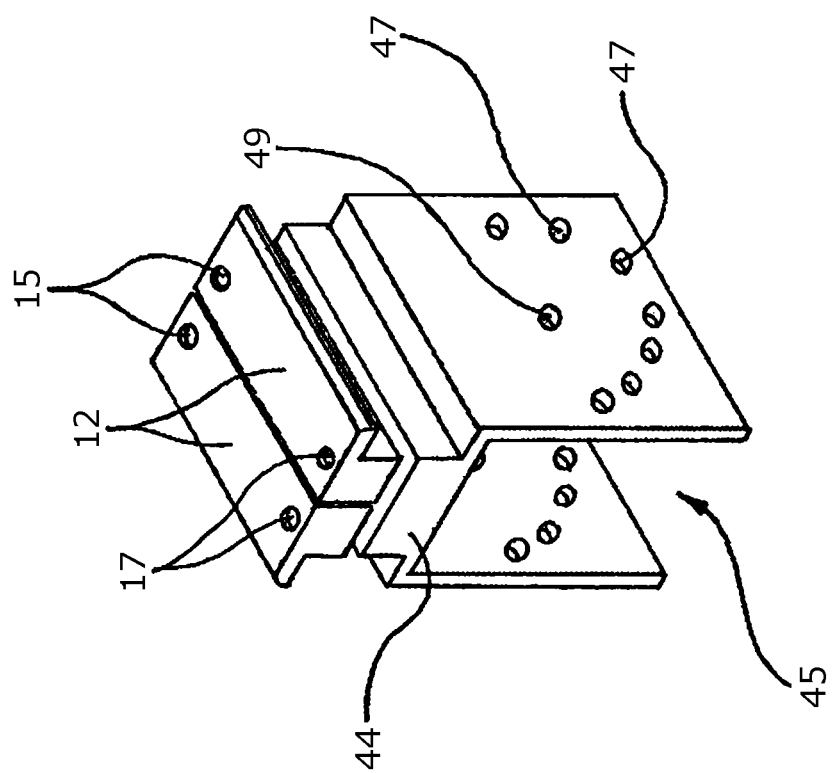

In an alternative embodiment, the bottom plate 14 of clamp 10 may be integrated into plate 44 of mounting head 45. For example, as shown in FIGS. 4B and 5C-5D, and referring again to FIGS. 1B and 2D-2F, plate 44 incorporates the features of previously described bottom plate 14, such that top plate 12 can be directly fastened to plate 44 to secure panel 5 as illustrated, without the need for bottom plate 14.

Figure 7:
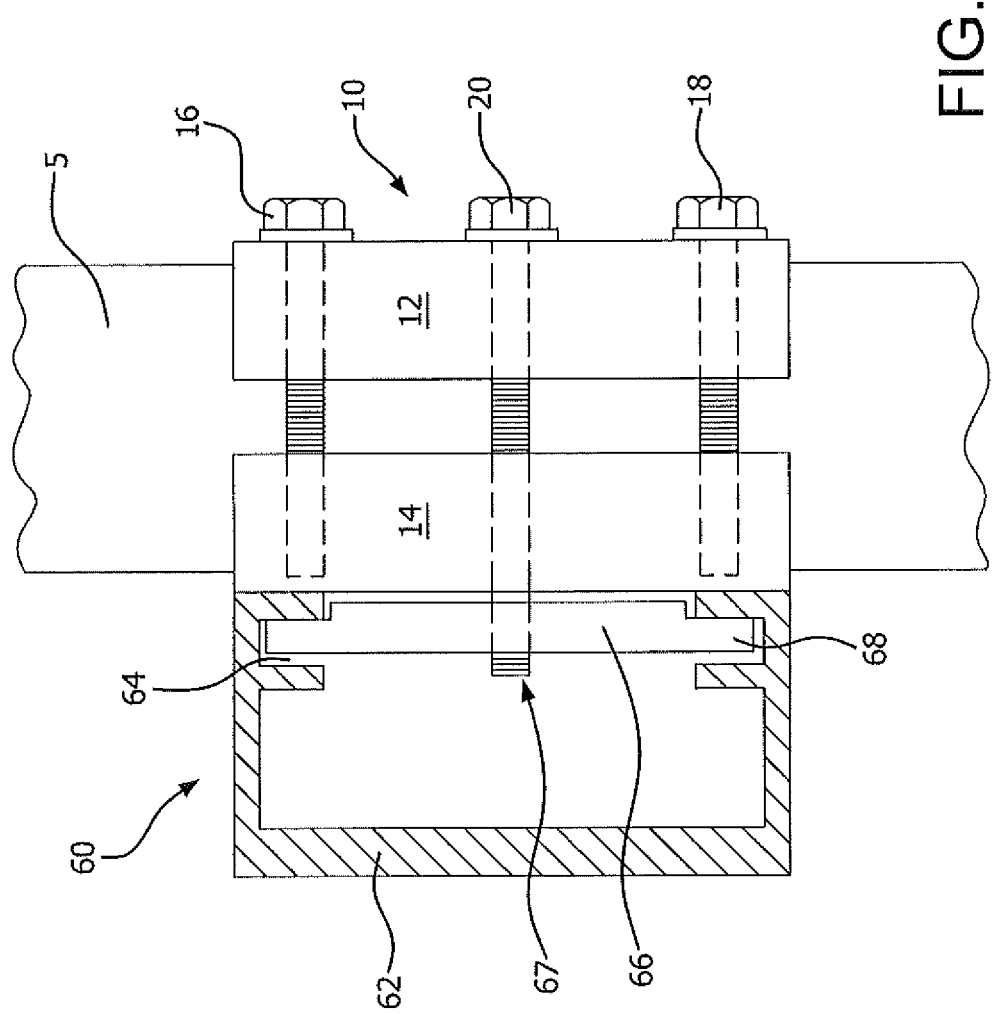
FIG. 7 is a side view of an exemplary panel clamping and rail mounting mechanism, according to an aspect of the present invention.

Holes 48 on top plate 44 of mounting head 45 are positioned to receive clamping mechanism 10 in a similar manner as described for attachment to clamp anchoring plate 32 of mount 30. Top plate 44 also includes a series of holes 48 for receiving a bolt for securing clamping mechanism 10 to top plate 44 of mounting head 45. Like the clamp anchoring plate of mount 30, top plate 44 may include two rows of 2, 3, 4, 5, 6, 7, 8, 9, 10 or any other number of holes running along the length of top plate 44 in parallel. Each row of holes is suitable for securing a clamping mechanism 10, such that two clamping mechanisms 10 may be secured, back-to-back, to top plate 44 of mounting head 45 at the same time. By having a series of holes in a row, a panel installer can elect which hole in the row is most suitable for attaching clamping mechanism 10 to mounting head 45, thereby providing the installer the ability to adjust the positioning of clamping mechanism 10 not only on the panel itself, but also with respect to where it is fastened to the mount. In another embodiment, clamping mechanism 10 may be attached to a rail mount. The mounting rail allows clamping mechanism 10 and attached panel 5 to slide within the rail system. As shown in FIG. 7, the rail mount 60 includes a base frame 62 having two grooves 64, in which a flange 68 on either side of sliding rail 66 fits, such that when flange 68 of rail 66 is positioned within grooves 64, rail 66 may slide along the length of frame 62. Rail 66 further includes an attachment point 67 which may include a series of holes (not shown) through which one or more bolts 20 of clamping mechanism 10 may engage rail 66. Similar to the previously described mounts, the number and position of holes for receiving bolt 20 of clamping mechanism 10 can be any number and located in any position.

In an alternative embodiment, frame 62 may have multiple rails 66 positioned along its length, such that each rail 66 within frame 62 may have one or more panels attached to them. As contemplated herein, there is no limitation to the number of rails within rail mount 60, and there is no limitation to the number of panels (attached by the clamping mechanisms) secured to each particular rail.

As shown in FIG. 7, when bolt 20 is secured tightly to rail mount 60, clamping mechanism 10 is forcibly held against frame 62, thereby holding clamping mechanism 10 and rail 66 in place. If bolt 20 is loosened, clamping mechanism 10 and rail 66 may freely slide along the length of frame 62. In alternative embodiments, the body of rail 66 (not including flange 68) may be thicker and extend outward from the outer face of frame 62, such that when clamping mechanism 10 is secured tightly to rail 66 via bolt 20, rail 66 may still slide freely along the length of frame 62.

Figure 8:
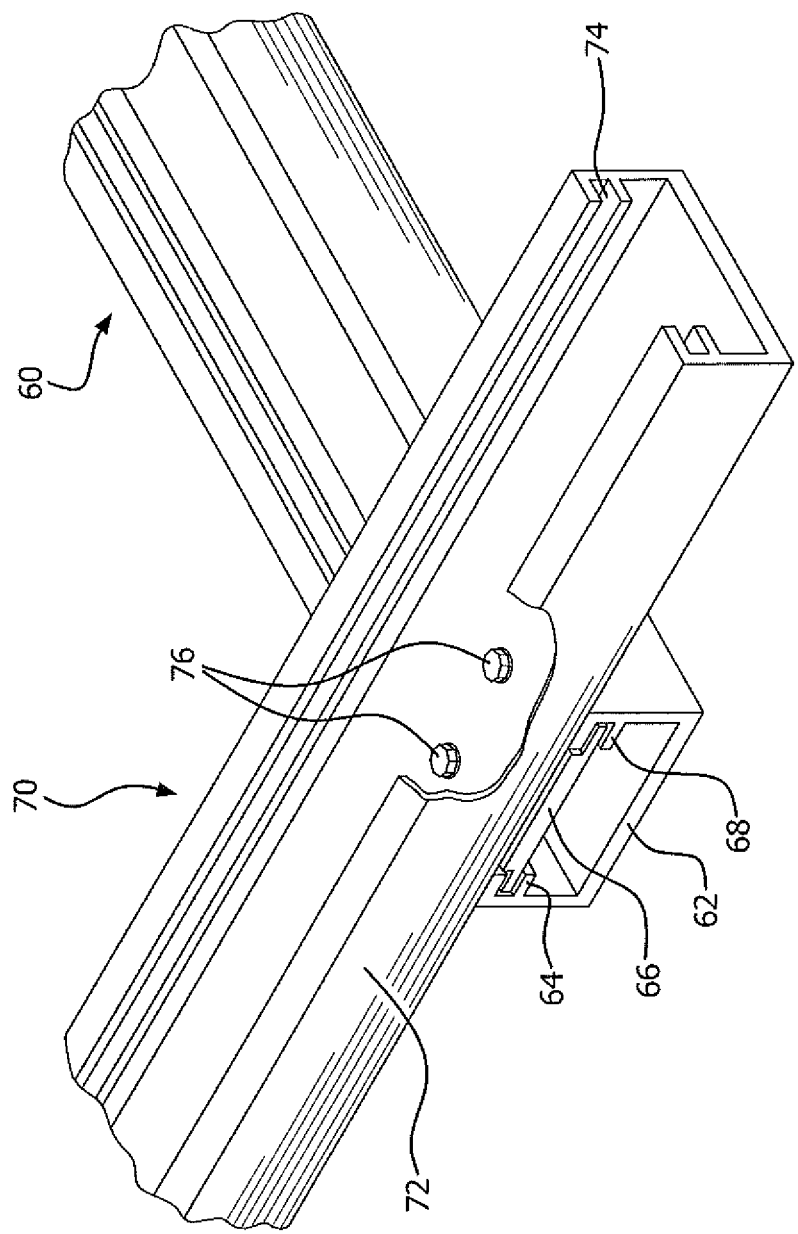
FIG. 8 is a perspective view of an exemplary rail mounting mechanism for a large scale utility frame, according to an aspect of the present invention.
Figure 9:
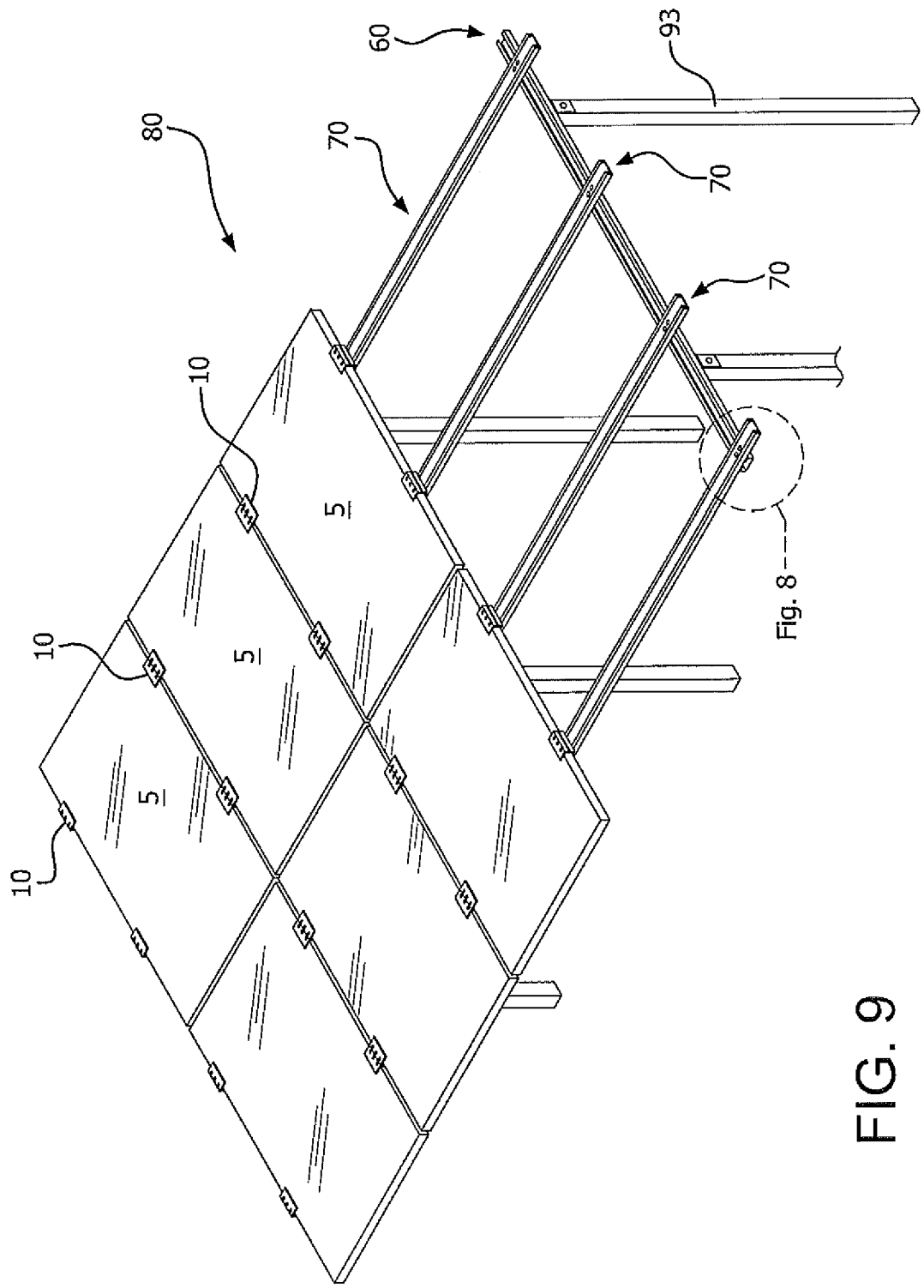
FIG. 9 is a perspective view of an exemplary panel array on the rail mounting mechanism of FIG. 8, according to an aspect of the present invention.

The rail mount is particularly useful when assembling the base for a large scale utility frame, because there is no need to manufacture additional parts. For example, as shown in FIGS. 8 and 9, an installer can secure one rail mount 70 into another rail mount 60. Rail mount 60, being similar to and having like parts as described in FIG. 7, may include two holes (not shown) for receiving bolts 76, instead of bolt 20 from a clamping mechanism. In this example, bolts 76 are used to secure the base of frame 72 onto rail 66 of rail mount 60 at any angle desired, such that rail mount 70 runs substantially perpendicular to rail mount 60, or at any angle between and including 0° and 180°, as desired. As shown in FIG. 9, a panel array 80 can be assembled, where each panel 5 has at least one clamping mechanism 10 attached thereto, which is in turn attached to rail mounts 70 in the same manner as previously described. Panel array 80 may be either attached to a plurality of mounting arms 42 and secured to the desired surface, or alternatively, panel array 80 can be directly secured to the desired surface via rail mounts 60. In a further embodiment, rail mounts can be attached to other mounting mechanisms described herein, such as to mount 30 of FIG. 1A. In the event mounting arms 42 are used, such arms may be anchored to the rail mount and/or to the surface by standard attachment mechanisms as would be understood by those skilled in the art. Mounting arms 42 may further be adjustable in height, such as by telescoping means, for example, as would also be understood by those skilled in the art.

Figure 10:
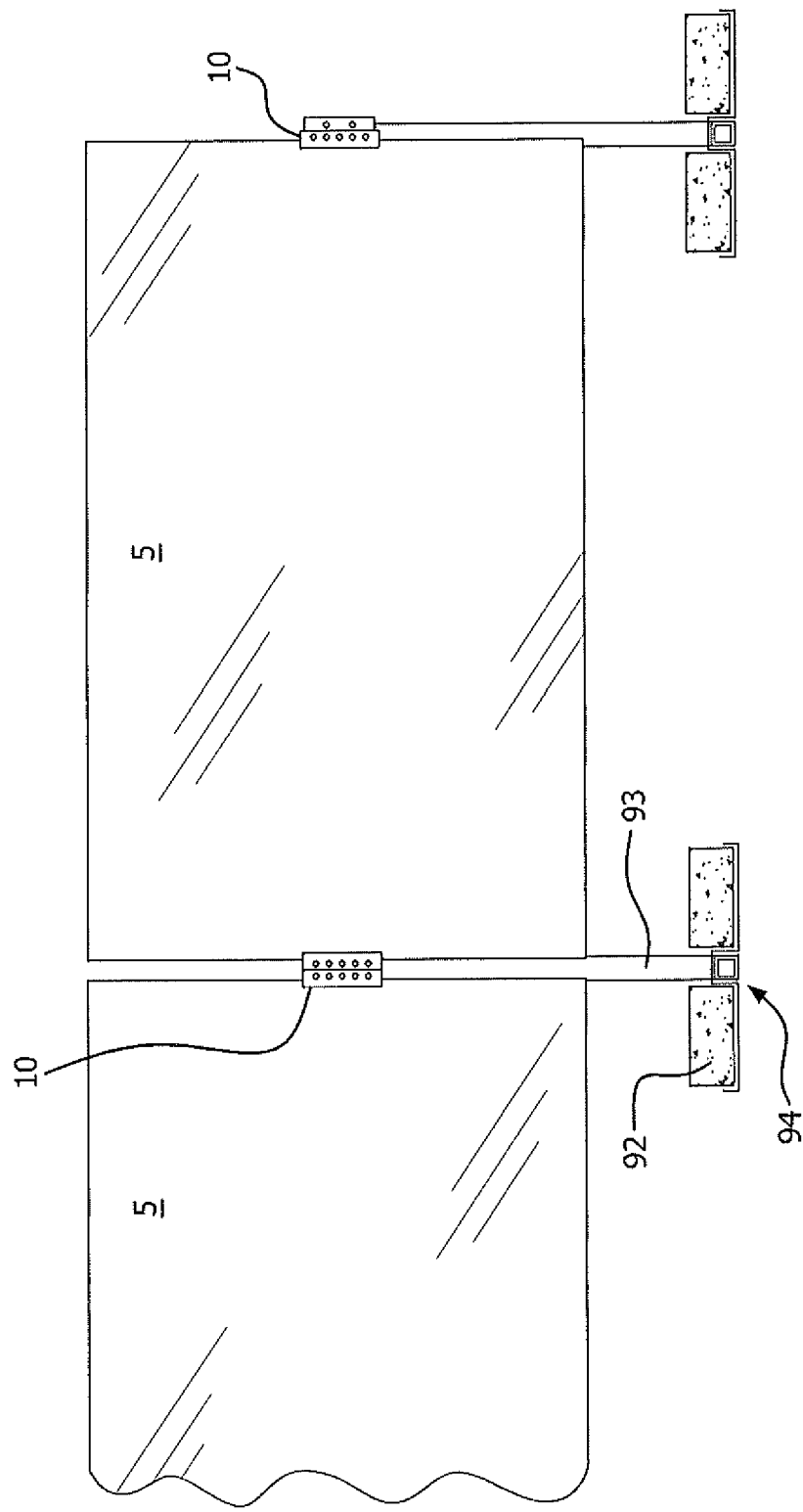
FIG. 10 is a front view of an exemplary panel array attached to supportive legs held down with a ballast pan and weight, according to an aspect of the present invention.
Figure 11:
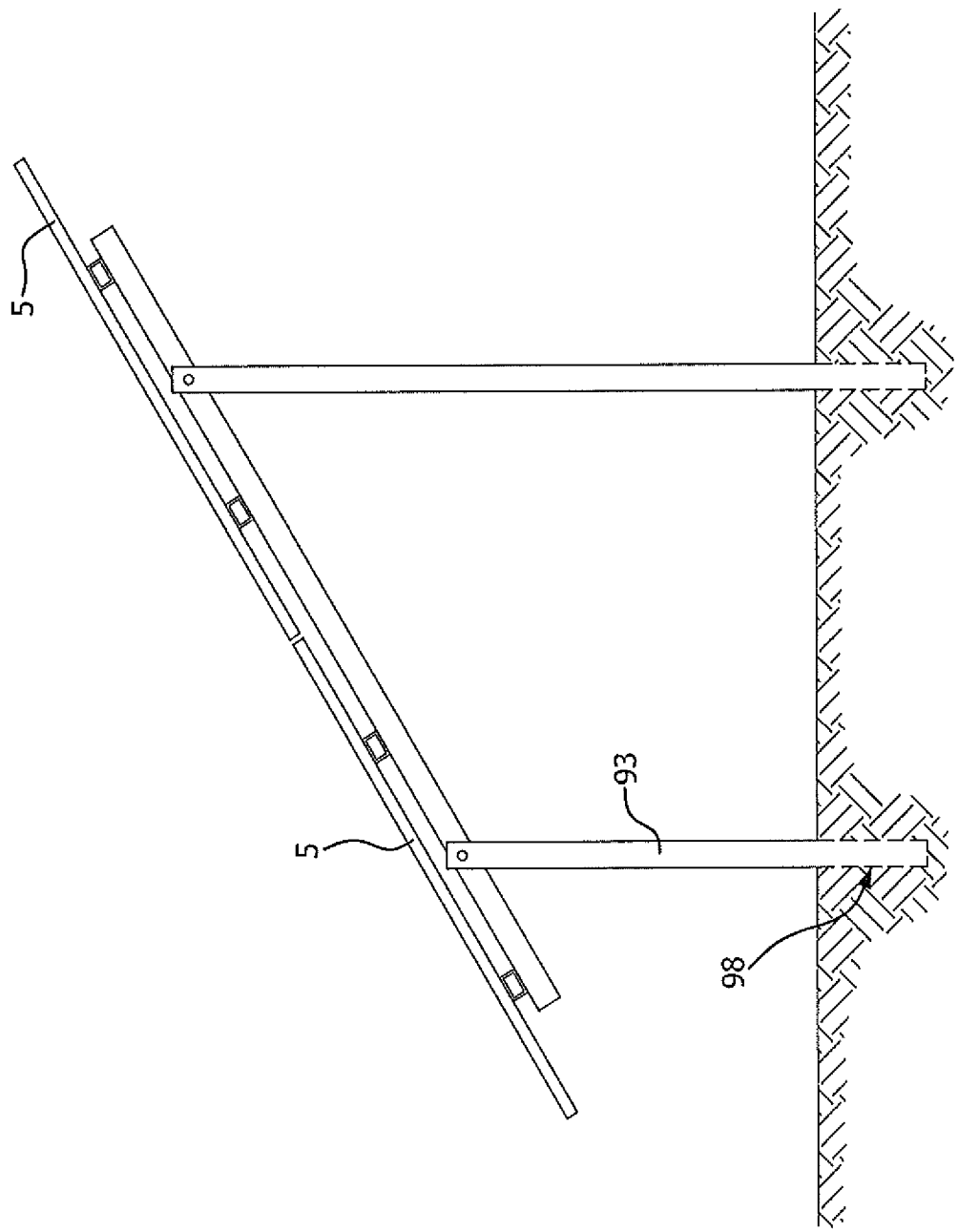
FIG. 11 is a side view of an exemplary panel array attached to supportive legs that are buried into the mounting surface, according to an aspect of the present invention.
Figure 12:
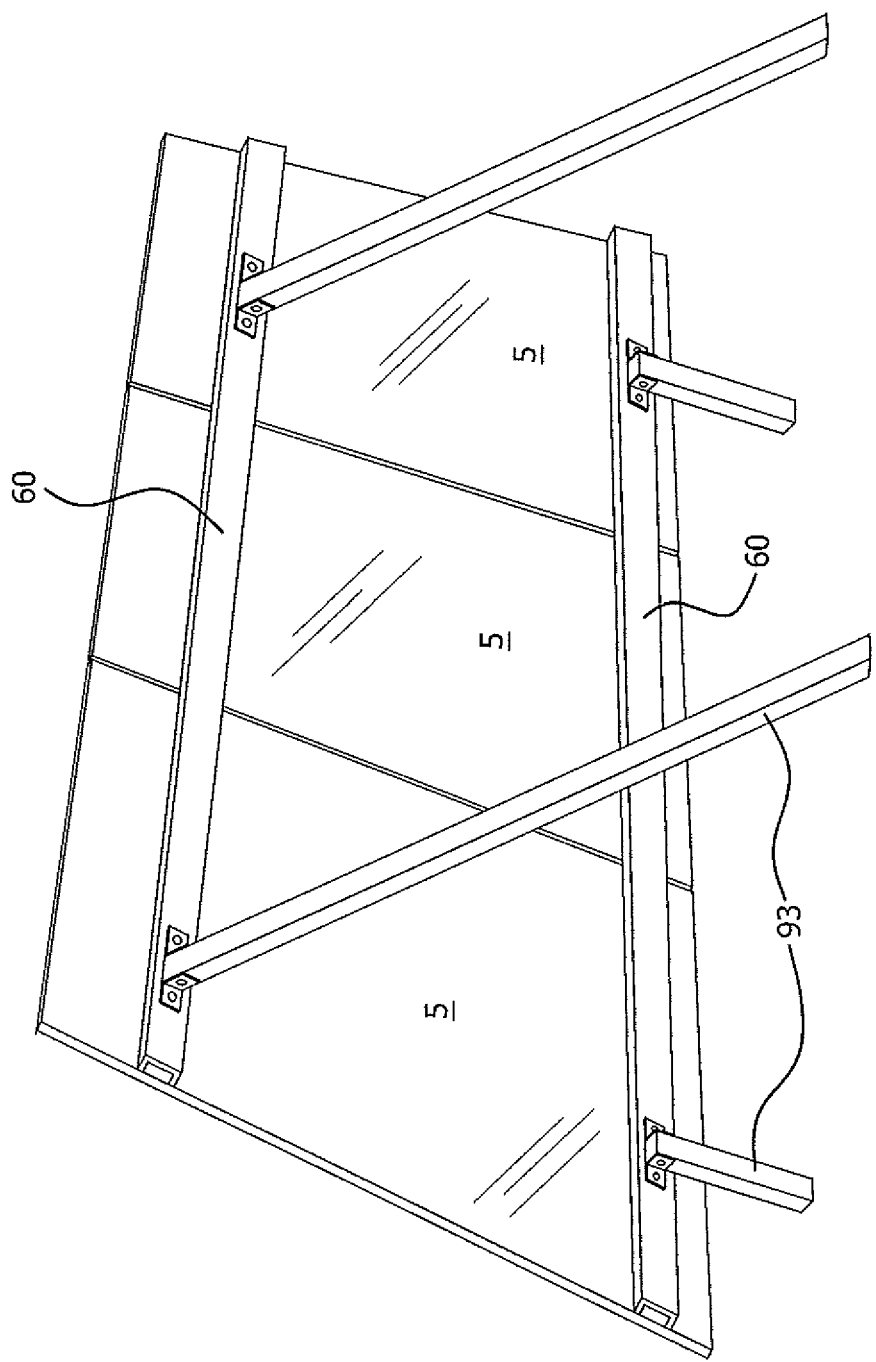
FIG. 12 is a perspective view of an exemplary panel array on a rail mounting mechanism attached to support legs, according to an aspect of the present invention.

In another embodiment, clamping mechanism 10 can be fastened to a standard joint or bracket that is further attached to a plurality of supportive legs. As shown in FIG. 10, clamping mechanism 10 may be secured to panels 5, and further attached to support legs 93 by a joint, bracket, or other attachment mechanism (not shown). The size of the leg joint can range from 1 inch to 10 feet in length. The joint may also be used for single or double leg 93 mounting. Support legs 93 may range from 1 to 20 feet in length, and may be fastened to the surface by bolts, or alternatively to a ballast pan 94 for holding weights 92, such as concrete blocks. Support legs 93 may further be a "T" bar support, such that the crossbeam of the "T" bar is positioned on the desired mounting surface, and ballast pan 94 rests overtop the crossbeam component of support leg 93, as shown in FIG. 10. Alternatively, ballast pan 94 may include grooves where metal plates can slide through for weights 92 to hold down supportive legs 93. In other embodiments, the ballast pan can be replaced by a series of one or more rods, wherein the rods can pass through the support legs or overtop the support legs, such that weights 92 can be positioned overtop the rods to hold down and support the structure. If an array of panels is desired and multiple mounts/support legs are used, the rods could pass through the legs of each mounting mechanism, with the rods only being secured directly to the desired surface at either end of the array. This would reduce the number of times an installer would need to puncture a roof to support the panel array, for example. In still other embodiments, such as that shown in FIG. 11, supportive legs 93 may be buried into the desired surface (98). In the embodiments of FIGS. 11 and 12, supportive legs 93 may be attached to a rail mount system, as previously described.

Any of the mounting mechanisms described herein may be constructed from any suitable building material that provides sufficient strength, rigidity and durability, such as metals, galvanized metals, moldable polymers and polymer blends, rubber and the like. All bolts, pins or other mechanical fastening components may be customized or of a standard size and commercially available. Consequently, the diameter of any particular hole will be based on the desired bolt or pin to be received therein.

In other embodiments, the clamping mechanism and/or mounting mechanism may include a grounding lug. In other embodiments, the clamping and/or mounting mechanism may include a microinverter in communication therewith. In further alternative embodiments, the clamping mechanism can be integrated into any of the mounting mechanisms as described herein throughout, such that the clamp and mount form a single piece or unit. In still other embodiments, the clamping mechanism may be slidably attached to a mount, such as by a fitted flange and groove sliding system. It should be appreciated that the clamping mechanism may alternatively be attached or integrated with mount by any means understood by those skilled in the art. In this way, the single unit clamp-mount can be securely fastened to the desired surface, and the panel can be placed within the loose clamp portion by the installer. Once the panel is positioned in the desired spot, the installer can tighten the clamp to secure the panel to the mount.

The disclosures of each and every patent, patent application, and publication cited herein are hereby incorporated herein by reference in their entirety.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A system for securing a panel having a top surface and a bottom surface, the system comprising:
   a frame comprising a base, side walls, and opposing grooves, wherein the base of the frame includes at least one hole passing therethrough;
   a rail element having flange portions on opposing sides of the rail element, such that the flange portion on each side of the rail element fits slidably within the opposing grooves, and wherein the rail element includes at least one rail element hole passing therethrough;
   a clamping mechanism comprising a first member and a second member, said first member having a top surface, a bottom surface, and at least one first member hole extending through the top surface and the bottom surface of the first member;
   and said second member having a top surface, a bottom surface and at least one second member hole extending through the top surface and the bottom surface of the second member;
   wherein when at least a portion of the first member is fitted over the top surface of the panel and at least a portion of the second member is fitted over the bottom surface of the panel, such that the at least one first member hole in the first member is substantially aligned with the at least one second member hole in the second member, a mechanical fastener is insertable through the first member hole and through the second member hole to secure the first and second members to the panel; and
   a mount for said frame, comprising a surface anchoring element having at least one mount hole therethrough and being securable to a surface.

2. The system of claim 1 wherein the clamping mechanism further comprises at least one panel anchoring hole extending through both of the first and second members and wherein when at least a portion of the clamping mechanism is substantially aligned with at least one rail element hole in the rail element, a mechanical fastener is insertable through the at least one panel anchoring hole and the at least one rail element hole to secure the clamping mechanism to the rail element.

3. The system of claim 2 wherein the clamping mechanism and the rail element can be securely fastened together and to the frame with a single mechanical fastener.

4. The system of claim 1 comprising a plurality of frame elements, at least a first frame element intersecting with a second frame element; wherein the second frame element contains at least one frame hole in the base; and wherein the at least one frame hole in the base is aligned with at least one rail hole, wherein the second frame element can therefore slide on the first frame element via the rail element.

5. The system of claim 1 wherein the panel is a photovoltaic (PV) module or a liquid crystal display (LCD).

6. A system for securing a panel having a top surface and a bottom surface, the system comprising:

a frame for receiving a rail element, said frame having a base, side walls, and opposing grooves, wherein the base of the frame includes at least one hole passing therethrough for securing said frame to a surface;

said rail element having flange portions on opposing sides of the rail element, such that the flange portion on each side of the rail element fits slidably within the opposing grooves, and wherein the rail element includes at least one rail element hole passing therethrough;

and a first member having a top surface, a bottom surface, and at least one first member hole extending through the top surface and the bottom surface of the first member; and a second member having a top surface, a bottom surface, and at least one second member hole extending through the top surface and the bottom surface of the second member;

wherein, at least a portion of the first member is fitted over the top surface of the panel and at least a portion of the second member is fitted over the bottom surface of the panel, such that the at least one first member hole in the first member is substantially aligned with the at least one second member hole in the second member, and each of the first member hole and the second member hole are aligned with the at least one rail element hole; wherein a mechanical fastener is insertable through the first member hole and through the second member hole to secure the first and second members to the panel.

7. The system of claim 6 wherein the mechanical fastener is insertable through the first member hole and through the second member hole and through the at least one rail element hole; wherein compression of the rail element against the opposing grooves secures the rail element to the frame.

8. The system of claim 6 further comprising a mount comprising a surface anchoring element having at least one mount hole therethrough and being securable to a surface; wherein said mount is connected to said frame.

9. The system of claim 6 wherein the first member contains at least one first member second hole and the second member contains at least one second member second hole; wherein the at least one first member second hole in the first member and the at least one second member second hole in the second member are aligned; wherein a mechanical fastener is insertable therethrough to secure the first and second members to said panel.

10. The system of claim 6 wherein the frame comprises a plurality of frame elements; wherein a frame element may be secured to said rail element.

11. The system of claim 6 wherein the panel is a photovoltaic (PV) module or a liquid crystal display (LCD).

* * * * *